United States Patent
Galinier (10) Patent No.: US 8,925,125 B2
(45) Date of Patent: Jan. 6, 2015

(54) METHOD FOR PRODUCING A BASIN INTEGRATED IN A RECEIVING PLANE, RECEIVING PLANE FOR CARRYING OUT THE METHOD AND MONOBLOC ASSEMBLY OBTAINED BY THE METHOD

(75) Inventor: Benoit Galinier, Albi (FR)

(73) Assignee: Chene Vert, Albi (FR)

( * ) Notice: Subject to any disclaimer, the term of this patent is extended or adjusted under 35 U.S.C. 154(b) by 607 days.

(21) Appl. No.: 13/240,137

(22) Filed: Sep. 22, 2011

(65) Prior Publication Data
US 2012/0073042 A1 Mar. 29, 2012

Related U.S. Application Data

(60) Provisional application No. 61/386,703, filed on Sep. 27, 2010.

(51) Int. Cl.
| E03C 1/33 | (2006.01) |
| B29C 45/14 | (2006.01) |
| B29C 45/16 | (2006.01) |
| E03C 1/18 | (2006.01) |
| B29K 711/14 | (2006.01) |
| B29L 31/00 | (2006.01) |

(52) U.S. Cl.
CPC ..... B29C 45/14336 (2013.01); B29C 45/14344 (2013.01); B29C 45/14778 (2013.01); B29C 45/1671 (2013.01); E03C 1/18 (2013.01); E03C 1/33 (2013.01); B29C 45/14311 (2013.01); B29K 2711/14 (2013.01); B29L 2031/7698 (2013.01)

USPC .................................................. 4/631

(58) Field of Classification Search
CPC ........................................ E03C 1/33
USPC ........................................ 4/619–660
See application file for complete search history.

(56) References Cited

U.S. PATENT DOCUMENTS

| 5,476,135 A | * | 12/1995 | Volkmann | ..................... 164/374 |
| 6,311,345 B1 | * | 11/2001 | Limbach | ........................... 4/632 |
| 2010/0175182 A1 | | 7/2010 | Konno | |

FOREIGN PATENT DOCUMENTS

| EP | 1076740 | 4/1999 |
| ES | 2265214 | 1/2004 |
| FR | 2778419 | 7/1998 |
| JP | 53077760 | 7/1978 |
| JP | 58028315 | 2/1983 |
| JP | 59196219 | 11/1984 |
| WO | 9957383 | 11/1999 |
| WO | 03080949 | 10/2003 |
| WO | 2009004896 | 1/2009 |

* cited by examiner

Primary Examiner — Lori Baker
(74) Attorney, Agent, or Firm — Young & Thompson (57) ABSTRACT

A method for producing a basin (1) integrated in a work plane, called the receiving plane (2), having an upper surface (2a) and a lower surface (2b), according to which method the receiving plane is pierced right through and an opening (3) adapted to receive the basin is formed, this receiving plane is installed in a mould (10) and the basin is moulded by injecting synthetic material directly onto the edge (3a) of the opening of the receiving plane. A receiving plane suitable for carrying out the method and a monobloc plane/basin assembly thus obtained are also described.

21 Claims, 3 Drawing Sheets

Fig 1

METHOD FOR PRODUCING A BASIN INTEGRATED IN A RECEIVING PLANE, RECEIVING PLANE FOR CARRYING OUT THE METHOD AND MONOBLOC ASSEMBLY OBTAINED BY THE METHOD

BACKGROUND OF THE INVENTION

The invention relates to a method for producing a monobloc assembly comprising a basin integrated in a receiving plane, in particular a sanitary surface or work surface of a bathroom or kitchen. It extends to a receiving plane used in this method and to the monobloc assembly thus obtained.

DESCRIPTION OF THE RELATED ART

Bathroom or kitchen furniture possesses an upper panel forming a sanitary or work surface, in which a basin, generally a sink or washbasin, is embedded; this upper panel may be clad with a covering (in particular made of laminate) and is often designated as a "receiving plane". Two types of known techniques enable the basin to be integrated in the receiving plane. After an opening has been made in the latter, the basin can be put in place in said opening either from below the receiving plane or from above the latter.

It is known, for example from the patent EP 1 076 740, to employ this second technique which makes it possible to obtain an assembly in which the basin is flush with the level of the upper surface of the receiving plane. This flush fitting of the basin has the advantage of ensuring surface continuity between the basin and the receiving plane, avoiding accumulations of soiling and facilitating cleaning.

However, this technique, although it is satisfactory for producing single pieces, has numerous disadvantages when series production is envisaged. This is because the mounting of the basin in the opening made in the receiving plane requires numerous adjustments both vertically to make the border of the basin flush with the level of the receiving plane and radially, when it is necessary for the contour of the basin to follow exactly the contour of the opening made in the receiving plane. Thus, the machining of the opening which requires great precision in the three dimensions to conform to the shape of the basin has a fairly large tolerance, due to the wear of the tools and the relative brittleness of the material when the plane consists of bonded wood particles. Similarly, the contour of the basins, even if the methods for obtaining the latter are more precise, has to be provided at the maximum tolerance of the openings of the receiving planes and therefore requires individual sanding and adjustments to match each basin with each plane.

Moreover, the use of various adhesive bonds and resin fillings necessitates waiting times (drying, polymerisation, etc.) and numerous manipulations (placing in a press for bonding, turning the planes over for casting the resin heel, etc.) which have an adverse effect on the quality and productivity during series production.

SUMMARY OF THE INVENTION

The present invention proposes overcoming the disadvantages of the known prior art mentioned above by enabling perfect flush mounting of the basin in the receiving plane to be obtained, with a cycle time suitable for series production without sacrificing the desired aesthetics for this type of product.

A further objective of the invention is to enable the production of an assembly in which the fixing of the basin has simultaneously the advantages of a basin inserted from above and from below, that is to say a positive locking, in the direction normal to the receiving plane, in one way as in the other.

The invention additionally aims to enable the production of a monobloc basin/receiving plane assembly in which the reliability and resistance over time and to external stresses are improved without sacrificing the appearance of the product.

The invention likewise aims to enable a finished appearance of outstanding quality to be obtained, with in particular perfect continuity between the basin and the receiving plane at the level of the upper surface of the latter.

The invention also aims to propose a method for producing a receiving plane/basin assembly which is capable of using various geometries and numerous materials for the receiving plane, without the need for extensive modifications.

In order to make the description clearer, it will be assumed, throughout the following, that the receiving plane and the basin are in their normal position of use, the terms "top", "bottom", "upper" and "lower" referring to this position.

To achieve these goals, the invention relates to a method for producing a basin integrated in a work plane, called the receiving plane, comprising an upper surface and a lower surface, according to which method the receiving plane is pierced right through and an opening adapted to receive the basin is formed, wherein:
  an injection mould for thermoplastic synthetic material is used, comprising:
    a first shell of generally concave shape, called the lower shell, adapted to bear on the lower surface of the receiving plane and
    at least one shell of generally convex shape, called the upper shell(s), adapted to bear on the upper surface of the receiving plane and form with the lower shell a moulding cavity, called the impression, with the shape of the basin to be obtained,
  the receiving plane is installed in the mould so as to clamp the periphery of the opening of the receiving plane between the lower shell and an upper shell in such a way that at least part of the edge of the opening constitutes a continuous peripheral wall of the mould connecting the lower shell to the upper shell,
  a thermoplastic synthetic material is injected into the impression so as to form a basin moulded onto the receiving plane.

Thus, the basin is formed directly on the receiving plane, the synthetic material constituting the basin flowing, in the liquid or viscous state, to fill the impression of the mould and reach the borders of the opening. Anomalies in the production of the edge of the opening, such as irregularities of the border which would have been visible in the embodiments of the prior art are masked by the synthetic material of the basin which fills them in. No adjustment of the contour of the basin is necessary for perfect adaptation to the contour of the opening of the receiving plane. The visible part of the basin has a smooth and shiny appearance depending on the material employed and the surface finish of the upper shell of the mould.

Advantageously and according to the invention, each upper shell of the mould is adapted to bear in a planar manner on the receiving plane and to form an upper wall of the impression extending solely at the level of and below the level of the upper surface of the receiving plane in order to obtain a moulded-on basin flush with the upper surface of the receiving plane. The embedding of the basin thus produced does not require any height adjustment to obtain a perfect flush mounting, the latter being produced by construction.

Advantageously and according to the invention, the lower shell forms a concave zone surrounded by a convex rim extending along the edge of the opening, inside and at a distance from the edge, projecting relative to the level of the lower surface of the receiving plane in the direction of its upper surface, said rim being adapted to enable the formation of a peripheral skirt of the basin between the edge of the opening and said rim during the moulding-on of the basin. The basin is thus "suspended" from the edge of the opening by its peripheral skirt, enabling relative flexibility of the holding of the basin in the receiving plane and improving the resistance of the assembly to external stresses (climatic cycles, impacts, etc.).

Advantageously and according to the invention, the lower shell has a shoulder at the base of the rim, facing the edge of the opening, adapted to enable the centring of the opening of the receiving plane relative to the injection mould. This shoulder enables the height of the skirt of the basin to be reduced and the material volume employed in the latter to be limited, while improving and facilitating the positioning of the receiving plane on the mould.

Advantageously and according to the invention, the shoulder has at regular intervals an increased height in the direction of the upper surface of the receiving plane in order to divide the skirt of the basin into independent sectors. Concomitantly with the reduction of the height of the skirt, the division of the latter into independent sectors enables any expansions of the material, particularly along the perimeter of the basin, to be absorbed.

Advantageously and in a first variant of the method according to the invention, during the injection stage, a single thermoplastic synthetic material is used to form the basin. The production method according to the invention thus requires only a single injection pass, thereby simplifying the process and reducing the number of operations.

Advantageously and according to the invention, a thermoplastic synthetic material chosen from polymethylmethacrylate or polycarbonates is used. These materials make it possible to obtain a surface finish and a quality of appearance comparable to the various types of basins on the market, whether they are made of synthetic material, enamel or porcelain. These materials also allow the incorporation of colorants, making it possible to match the colour of the basin with that of the receiving plane.

Advantageously and according to the invention, during the installation of the receiving plane in the mould, a reinforcing insert adapted to be embedded in the synthetic material injected at the injection stage is fixed to the receiving plane and/or the lower shell. Such an insert, which is in the form of an openworked cap for example, can thus be included in the thermoplastic synthetic material without affecting the aesthetics of the basin and provide it with certain mechanical properties (impact resistance, etc.) which cannot be achieved by the material used alone.

Advantageously and in a second variant of the method according to the invention, the injection stage is divided into two passes, a first pass using a first upper shell defining a first impression set back relative to the upper surface of the receiving plane and a first synthetic material chosen to impart a desired mechanical strength to the basin and a second pass using a second upper shell defining a complementary impression above the first impression and a second synthetic material chosen to provide a desired surface finish for the basin. In this variant, and according to the invention, a first synthetic material chosen from ABS, polycarbonates and polyamides is used and a second synthetic material chosen from polymethylmethacrylate or polycarbonates is used.

Advantageously and according to the invention, during the formation of the opening in the receiving plane, anchoring means adapted to enable the anchoring of the moulded-on basin to the receiving plane are produced on and/or in the vicinity of the edge of said opening. Depending on the material of the receiving plane, particularly if this material is smooth and without roughness, it may be useful to improve the resistance of the basin on the receiving plane by providing anchoring means on the latter.

Advantageously and according to the invention, said anchoring means have at least one radial groove formed in the edge of the opening, parallel to the surfaces of the receiving plane. Such a radial groove thus produces a positive locking of the basin in the receiving plane, in a direction orthogonal to the plane and in both ways, making the basin perfectly secured to the receiving plane, whatever forces are applied, both under operating load (weight of water for example) and under more exceptional loads such as those resulting from stacking the monobloc assemblies during transportation.

Advantageously and according to the invention, a receiving plane comprising a supporting panel covered with a decorative sheet on the upper surface of the receiving plane is used, and at least one radial groove is formed in the supporting panel, its width being limited in the direction of the upper surface of the receiving plane by the decorative sheet. By thus producing the groove just below the decorative sheet, a bonding of the thermoplastic synthetic material to the decorative sheet is obtained, the sheet itself usually being made of synthetic material, and the peripheral sealing of the basin is greatly improved.

Advantageously and according to the invention, said anchoring means further have an orthogonal groove formed in the lower surface of the receiving plane, substantially parallel to the contour of the opening, and connected to the latter by a radial recess of said lower surface. The anchoring means thus produced form a peripheral profile having a hook-shaped cross-section ensuring radial holding of the basin, and a stop heel of the latter cooperating with the general shape of the rim of the basin to hold the receiving plane in a rebate.

Advantageously and according to the invention, a series of holes are made in the lower surface of the receiving plane which are orthogonal to this surface, regularly spaced on the contour of the opening, at a distance from the edge of the latter, pass through the radial groove(s) without opening onto the upper surface of the receiving plane, and are adapted to form a radial anchorage of the basin and also a compensating space for the injected synthetic material. This arrangement makes it possible to improve the radial fixing of the basin in the receiving plane, to avoid shrink marks and to perfect the finish of the border of the basin by enabling the material to flow beyond this border.

Advantageously and according to the invention, during the formation of the opening in the receiving plane, indexing receptacles are made in the lower surface of the receiving plane which are adapted to cooperate with projections formed on the lower shell in order to position and hold the receiving plane in the injection mould. These projections, arranged circumferentially around the opening of the receiving plane, also enable the radial forces developed by the injection of the synthetic material to be absorbed and possible rupture of the receiving plane under the injection pressure to be prevented.

Advantageously and according to the invention, the lower shell has means for immobilising the receiving plane which are adapted to withstand a radial injection pressure exerted on the edge of the opening. In view of the injection pressures required for ensuring good filling of the mould, the edge of the opening of the receiving plane is subjected to a high radial pressure which may cause the receiving plane to rupture. Besides the projections and indexing receptacles which may perform secondary functions of holding the receiving plane, there are provided on the lower shell means for immobilising the plane, in the form of prominences which are anchored in the lower face of the plane or else movable abutments which bear on the outer borders of the receiving plane at the most fragile places.

Advantageously and according to the invention, at least one of the shells of the mould has bosses interrupting the continuity of the impression and adapted to form orifices in the basin during the moulding-on. By virtue of these bosses, which act as moulding inserts, optionally retractable (slides), orifices such as an overflow or plug hole of the basin are produced simultaneously during the injection, with a precision and surface finish greater than that which could be obtained by machining, without recourse to additional tool changes.

The invention also extends to a receiving plane, suitable for carrying out the method mentioned above, having a closed-contour opening passing through said plane from its upper surface to its lower surface and having an edge, wherein said edge has at least one radial groove extending at least partly along said contour in a plane parallel to the surfaces of the receiving plane.

Advantageously and according to the invention, said receiving plane comprises a supporting panel covered with a decorative sheet on its upper surface, the radial groove adjoining the decorative sheet which forms an overhang above the groove.

The invention also extends to a monobloc assembly comprising a receiving plane and at least one basin which are integral with one another, wherein each basin is moulded onto the edge of an opening formed in the receiving plane.

BRIEF DESCRIPTION OF THE DRAWING FIGURES

Other objects, features and advantages of the invention will become apparent from the following description and the appended drawings in which.

DETAILED DESCRIPTION OF THE INVENTION

Figure 1:
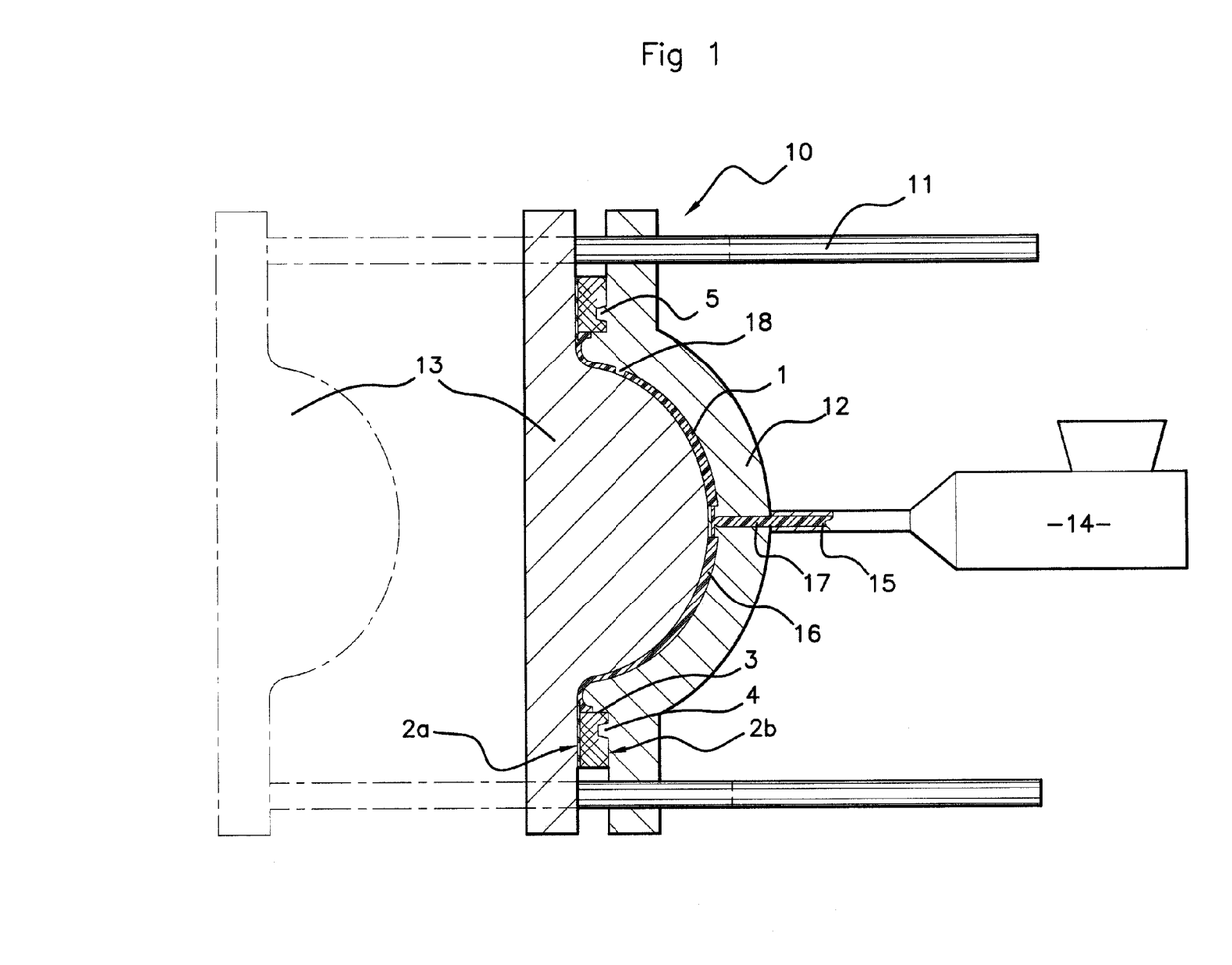
FIG. 1 shows a schematic view of a moulding press carrying out the method according to the invention.

The method for producing a basin 1 integrated in a work surface or receiving plane 2 is illustrated in FIG. 1. According to this method, an opening 3 is cut out of the receiving plane 2, with a shape adapted to the contour desired for the basin. The cutting of the opening 3 out of the receiving plane 2 is effected in a conventional manner, for example by recessing and shaping with a form cutter. However, within the context of the invention, certain modifications which will be detailed below have been made to this operation.

One type of receiving plane 2 commonly employed for producing kitchen or bathroom work surfaces having a sink or basin (the latter term will be used throughout the text with the general meaning of a basin designating any type of sink, washbasin, trough, bowl, etc.) is constituted by a supporting panel 8 (FIG. 2), generally made of wood or wood particles bonded by synthetic resin. The supporting panel 8 may be covered on one surface (generally used as the upper surface) with a decorative sheet 9, of low thickness, generally made of synthetic material, for example a sheet of laminate imitating wood or marble or any decorative material, or paper impregnated with resin, etc. Of course, according to the method of the invention, any other material suitable for forming a receiving plane, such as marble, granite, synthetic material sheet, etc. may be employed.

Before the cutting-out of the opening 3 is performed, for example on a numerically controlled recessing and shaping/routing machine, indexing receptacles 4 are made on the lower surface 2b of the receiving plane, enabling subsequent positioning of the receiving plane with precision.

Figure 2:
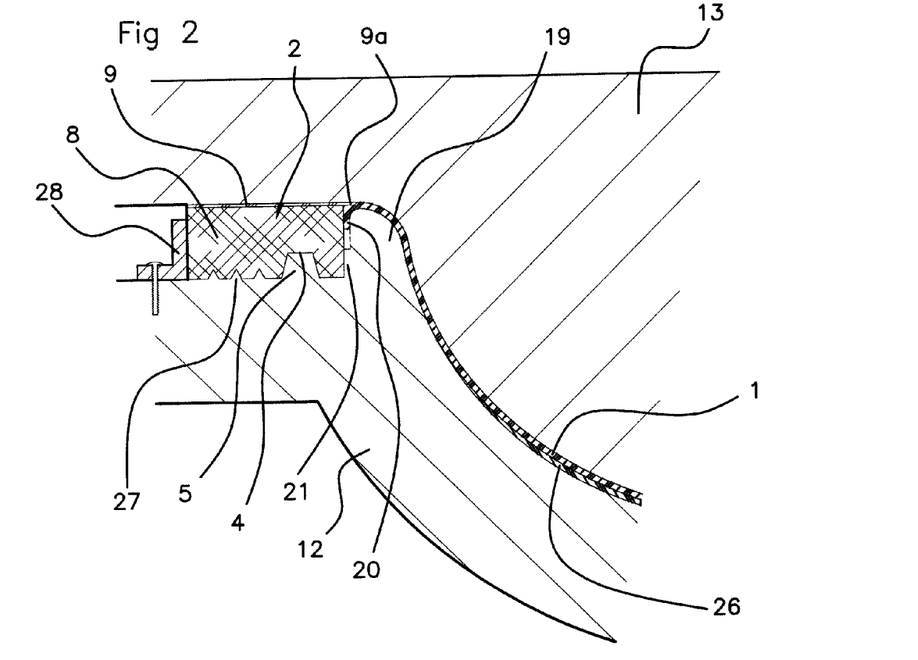
FIG. 2 shows a partial radial section of a receiving plane and a moulded-on basin still in the mould according to a first embodiment of the monobloc plane/basin assembly.

As will be seen below, the edge 3a of the opening 3 can have essentially two shapes: in a first embodiment of the opening, illustrated in FIGS. 1, 2 and 4b, the edge 3a is made by a cutout substantially orthogonal to the planes of the main surfaces of the receiving plane. Advantageously, when the receiving plane 2 is formed by a supporting panel 8 and a decorative sheet 9, the cutting-out of the opening 3 is effected through the entire thickness of the supporting panel 8, leaving at least part of the decorative sheet 9 remaining, to form an overhang 9a above the opening.

Figure 3A:
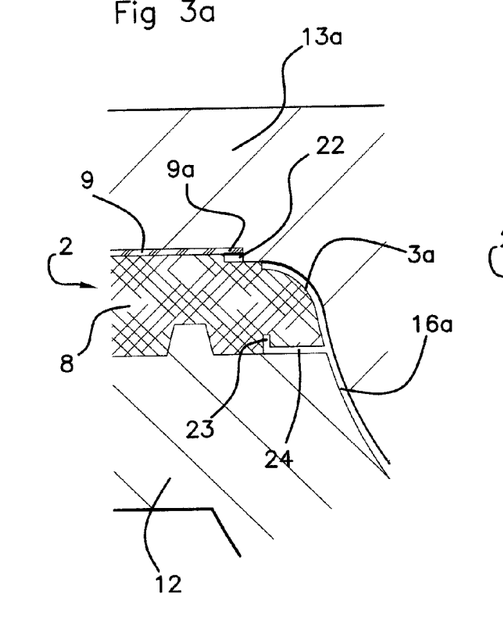
FIGS. 3A and 3B illustrate the method of the invention in its implementation according to a second variant.
Figure 3B:
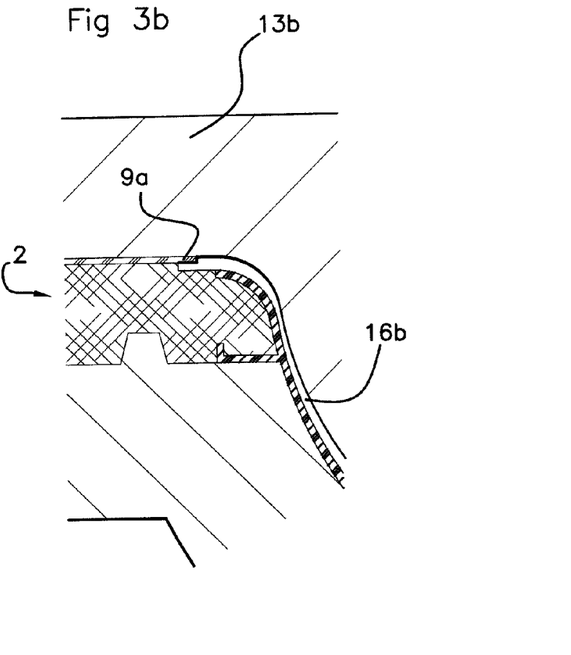
Figure 4A:
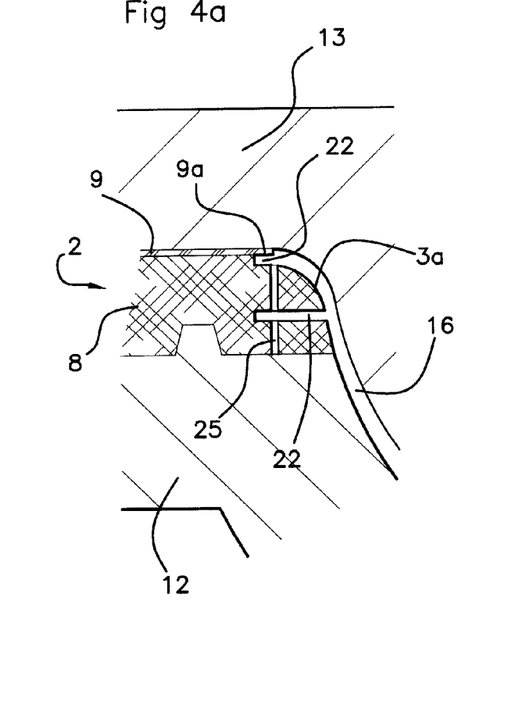
FIGS. 4A and 4B show different embodiments of the means for anchoring the basin on the receiving plane.

In a second embodiment of the opening, illustrated in FIGS. 3a, 3b and 4a, the edge 3a of the opening has a curved profile, substantially parallel to the shape of the wall of the basin.

Whatever the shape of the edge of the opening, the receiving plane 2 is then placed into an injection mould 10 for thermoplastic synthetic material in order to mould the basin 1 directly onto the receiving plane 2.

The mould 10 comprises a first shell which is called the lower shell 12 with reference to a top/bottom direction as defined above relative to the direction of the basin in the use position. The lower shell 12 has a central zone of generally concave shape adapted to form the bottom surface of the basin. At the periphery of the concave zone of the lower shell, the latter is adapted to bear in a planar manner on the lower surface 2b of the receiving plane and has projections 5 adapted to engage in the indexing receptacles 4 provided in the lower surface 2b of the receiving plane 2.

The mould 10 also comprises a second shell called the upper shell 13, having a central zone of generally convex shape adapted to form the top surface of the basin. It should be noted that the surface of the upper shell 13 generally has a mirror finish so as to give the moulded basin a smooth and shiny surface finish and appearance.

At the periphery of the convex zone of the upper shell, the latter is adapted to bear in a planar manner on the upper surface 2a of the receiving plane 2. The upper shell 13 is slidably movable along columns 11 relative to the lower shell 12 by means of jacks (not shown) enabling the mould 10 to be closed.

When the mould 10 is open, the receiving plane 2 is installed on the lower shell 12, the projections 5 of the lower shell corresponding with the indexing receptacles 4 of the lower surface 2b of the receiving plane. The mould is then closed again by bringing the upper shell 13 towards the lower shell 12 by means of the jacks, until the receiving plane 2 is clamped between the two shells.

In this position, the convex zone of the upper shell 13 and the concave zone of the lower shell 12 face one another through the opening 3 and form a moulding cavity or impression 16 with the shape of the basin 1. The mould 10 is closed at the periphery of these two zones by at least part of the edge 3a of the opening of the receiving plane 2 which forms, between the two shells, a peripheral wall of the mould connecting the lower shell to the upper shell.

Advantageously, the mould 10 can have bosses 18, borne by either (or both) of the shells, passing through the impression 16 and interrupting its continuity at certain points to form orifices such as the overflow hole or the plug hole of the basin. For example, in FIG. 1 there are shown a simple boss 18 borne by the lower shell 12 for forming the overflow hole and a boss 18' borne partly by each of the shells and forming a plurality of radial injection channels adapted to distribute in the impression 16 the thermoplastic synthetic material coming from a main injection channel 17.

Then, by means of an injection moulding press 14, a thermoplastic synthetic material 15 heated to its melting point is injected into the impression 16 thus formed. Under the effect of the injection pressure, this thermoplastic synthetic material spreads in the impression 16 and reaches the borders of the latter formed by the receiving plane 2. The synthetic material, in the liquid or slightly viscous state, adheres to the edge 3a of the opening 3 at the places where it comes into contact with the edge and thus produces an "overmoulding" of at least part of this edge. After cooling and solidification of the synthetic material and removal from the mould, a monobloc assembly 30 (FIG. 5) comprising a basin 1 integral with the receiving plane 2 is obtained.

Advantageously, the upper shell 13 has a peripheral part bearing in a planar manner on the receiving plane 2 in continuity with the convex central zone to form an upper wall of the impression 16 which extends solely at the level of the upper surface 2a of the receiving plane 2 or below. Thus, the impression 16 does not extend above the receiving plane and the basin thus moulded on is flush with the upper surface of the receiving plane. In addition, since the thermoplastic synthetic material 15 is injected in liquid or slightly pasty form under high pressure, it fills in a radial direction the entire space formed along the cutout of the opening and ensures perfect continuity between the receiving plane and the basin.

Consequently, by virtue of the method according to the invention, it is no longer necessary to carry out long and painstaking adjustments both of the height and diameter of a basin preformed separately from the plane, in order to obtain perfect flush mounting thereof in the receiving plane.

In a first embodiment of the opening 3, in which the edge 3a is straight and substantially orthogonal to the upper surface 2a and the lower surface 2b of the receiving plane, the lower shell 12 has, around its concave central zone and inside the zone where it bears in a planar manner on the lower surface 2b of the receiving plane, a convex rim 19 which extends along the edge 3a of the opening, inside and at a distance from the edge. This rim 19 forms a projection relative to the bearing level of the lower surface of the receiving plane, in the direction of the upper shell. The vertex of the rim 19 remains below the plane of the bearing surface of the upper shell 13 on the upper surface 2a of the receiving plane. The inner surface of the rim 19 extending from its vertex towards the concave zone has a profile adapted to form, in continuity with this zone, the bottom surface of the basin.

The outer surface of the rim 19, facing the edge 3a, is set back relative to the latter at a distance substantially equal to the thickness of the wall of the basin, adapted to form a peripheral skirt 20 which is moulded in a manner bearing on the edge 3a. Advantageously, the skirt 20 meets the edge 3a below the overhang 9a of the decorative sheet 9 and is in contact with the overhang on its lower surface and on its inner border. This arrangement allows the molten synthetic material to flow below the overhang 9a to form the skirt 20 and adhere to the lower surface and the border of the overhang, thus forming a sealed connection between the receiving plane 2 and the basin 1.

The skirt 20 can extend over all or part of the height of the edge 3a. Preferably, the lower shell 12 has at the outer base of the rim 19 a shoulder 21 which comes into contact with the edge 3a and forms a base wall of the skirt 20, thus limiting its height. The shoulder 21 thus serves as a means for centring the opening of the receiving plane on the lower shell and limits the quantity of material used in the skirt 20.

The shoulder 21 also has, at regular intervals along the edge 3a, an increased height in the direction of the upper surface of the receiving plane, thus enabling the skirt 20 to be divided into independent sectors. In this way, the skirt 20 is at least partially discontinuous, enabling the expansion stresses along the skirt to be absorbed.

In a variant or in combination, when the receiving plane is formed by a supporting panel 8 made of bonded wood particles, the shoulder 21 can also be placed at least partially set back at a small distance from the edge 3a, for example of the order of 0.5 mm, to enable the entire edge 3a to be covered with a film of injected synthetic material, thus enabling the sealing to be improved and the penetration of moisture into the thickness of the panel to be prevented. Of course, some contact points are not set back, enabling the centring function of the receiving plane on the mould to be preserved.

This first embodiment, having an opening 3 with an edge 3a which is straight and orthogonal to the receiving plane 2, and a convex rim 19, enables control of the thickness of the wall of the basin 1 between the vertex of the rim 19 where it joins the receiving plane and the bottom of the basin. The wall of the basin 1 thus has a thickness varying from about 2 mm in the vicinity of the vertex of the rim 19 to about 4 mm at the bottom of the basin. The latter is then as it were "suspended" by the skirt 20 at the edge 3a, thereby introducing a certain flexibility which improves the resistance of the basin to thermal variations.

In a second embodiment of the opening in the receiving plane 2, the edge 3a of the opening has a curved profile substantially parallel to the shape of the wall of the basin 1. In this case, the lower shell 12 has no rim 19 and the concave central zone is directly connected to the part of the shell 12 adapted to bear in a planar manner on the lower surface 2b of the receiving plane. In the case where the receiving plane 2 has a decorative sheet 9 for example made of laminate bonded to a supporting panel 8, there are made during the cutting-out of the opening 2 one or more radial grooves parallel to the plane of the upper and lower surfaces of the receiving plane. In particular, a radial groove 22 is made just below the decorative sheet 9, this groove 22 being delimited at the top by the decorative sheet. In this way, as seen above in connection with the first embodiment, the synthetic material injected into the mould 10 has a compensation space enabling the material to fill in any variations of the cutout of the opening 2 and to adhere to the overhang 9a in order to strengthen the peripheral sealing of the basin. Moreover, it will be noted that such a radial groove forms a means for anchoring the basin 1 in the receiving plane 2. Other means for anchoring the basin 1 on the receiving plane 2 may comprise other radial grooves 22 placed, for example, at intermediate heights on the edge 3a of the opening 2 as shown in FIG. 4a, holes 25 made orthogonally to the lower surface 2b, distributed regularly about the opening 2 and passing through said grooves 22, enabling here again a compensation space to be provided for the injected synthetic material and an anchorage opposing any radial shrinkage of the borders of the basin 1.

Figure 4B:
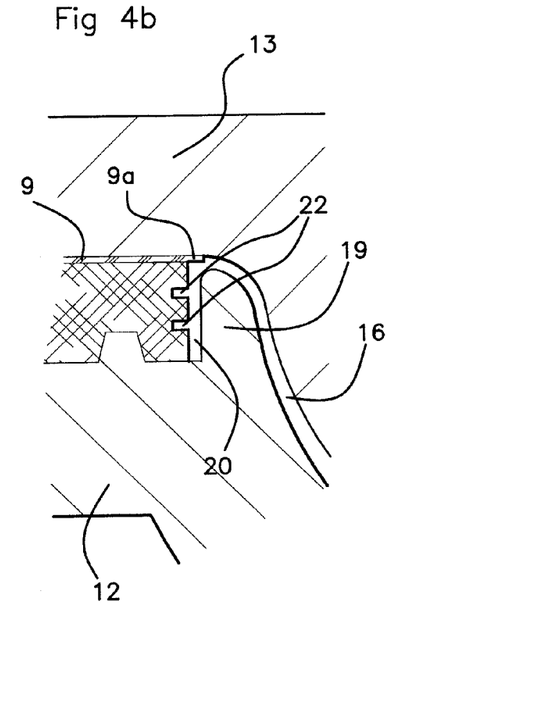

Of course, these anchoring means, in particular the radial grooves 22, can also be used in the first embodiment of the edge 3a of the opening, as shown in FIG. 4b, thus enabling the skirt 20 to be anchored in the edge 3a and withstand any stresses exerted on the basin orthogonally to the receiving plane (installation of the plane/basin assembly terminated in a manner bearing on the basin for example).

Other anchoring means may be provided according to requirements, such as a notch 23 orthogonal to the lower surface 2b, formed in the lower surface of the receiving plane, substantially parallel to the opening, and connected thereto by a radial recess 24 of said lower surface. Such an associated notch 23 and radial recess 24 thus cooperate with the border of the basin 1 bearing on the edge 3a to hold the receiving plane 2 in a rebate, thus immobilising the basin on the plane.

Whatever the shape of the edge 3a and of the lower shell 12, the method for producing a basin integrated in a receiving plane according to the invention may have two main variants.

In a first variant, the moulding of the basin 1 is effected in a single pass, using a single thermoplastic synthetic material. For example, the use of polymethylmethacrylate (PMMA) is particularly suitable with regard to the surface finish obtained for the basin. In particular, a PMMA of the type marketed by EVONIK Industries under the reference PLEXIGLAS® zk5HF, with a grade modified for better impact resistance and coloured with a white colorant enables a basin to be obtained which is comparable in its appearance to the thermoformed basins of the prior art. Of course, other materials may be used, such as polycarbonates (PC), in particular the polycarbonate marketed by UNIGEL PLASTIQUES under the reference DUROLON® IR2200 or the polyamides (PA12 for example, such as RILSAN® PA12 AMNO from ARKEMA).

However, in certain cases where the specifications of the basin require improved impact resistance for example, it may be necessary to reinforce the basin by inserting, before moulding, a reinforcing insert 26, for example in the form of a "basket" or cap moulded previously in a material providing increased resistance. For example a "basket" designed in the form of an openworked radial grid made of ABS may be arranged at the bottom of the lower shell 12, before the mould 10 is closed. During injection of the material 15, the latter coats and encompasses the "basket" which is embedded in the material thus injected and contributes to increasing the mechanical resistance of the bottom of the basin 1.

In a second variant of the method of the invention, the moulding of the basin 1 is effected in two stages, using two thermoplastic synthetic materials with different properties.

In a first pass, shown in FIG. 3a, an upper shell 13a which defines a first impression 16a with the lower shell 12 is used. This first impression is adapted to form, after injection, a first layer of the basin 1, with a thickness less than the thickness of the finished basin, extending on the bottom of the basin. It will be noted that the upper shell 13a is adapted, when the mould 10 is closed, to block the groove 22 so as to prevent the injection of material into the latter during this first pass. A first thermoplastic synthetic material is then injected into the impression 16a. This first synthetic material is chosen according to the mechanical strength properties which it is able to impart to the final basin. For example, this first material is chosen from thermoplastic synthetic materials such as ABS, polyamides (with or without a glass fibre filler) or polycarbonates.

Once this first pass has been carried out, the mould 10 is opened and the upper shell 13a is replaced by an upper shell 13b adapted to define, above the layer moulded during the first pass, a second impression 16b forming the visible inner layer of the basin. A second thermoplastic synthetic material chosen to impart the surface finish and the appearance properties of the basin is then injected into the impression 16b.

For this second material, a material of the type of those mentioned above in connection with the first variant of the method using a single synthetic material (PMMA, polycarbonates, etc.) is preferably chosen.

As has been seen above, the cutting-out of the opening in the receiving plane differs from the cutouts produced for the receiving planes of the prior art in that anchoring means, for example in the form of one or more radial grooves 22, are provided in the edge 3a of the opening. These grooves 22 may be continuous or interrupted along the contour of the opening. They form recesses parallel to the faces of the receiving plane which are adapted to receive the injected synthetic material. In particular, the receiving planes according to the invention, when they are formed by a supporting panel 8 to which is bonded a decorative sheet 9, have a radial groove 22 adjoining the decorative sheet so that the latter forms an overhang 9a above the groove.

As has been seen above, the primary function of the indexing receptacles 4 made on the lower surface 2b of the receiving plane 2 is to cooperate with projections 5 provided on the lower shell 12 so as to position the receiving plane relative to the mould. Advantageously, at least some of these receptacles 4 and projections 5 are dimensioned so as to perform a secondary function of holding the receiving plane 2 in order to withstand the radial pressure exerted by the thermoplastic synthetic material during the injection of the basin 1.

However, depending on the respective sizes of the opening 3 made in the receiving plane 2 and of the receiving plane itself, it is possible for the edge 3a of the opening to be situated close to an outer border of the receiving plane so that the remaining radial wall of the receiving plane has insufficient thickness to provide the appropriate receptacles 4 and projections 5 to prevent rupture of the receiving plane under the effect of the injection pressure.

In this case, for a receiving plane 2 made of a deformable material such as a panel of bonded wood particles, the immobilising function of the receiving plane for withstanding the radial pressure can be produced by prominences 27 (FIG. 2) provided on the surface of the lower shell 12 receiving the receiving plane. For example, these prominences 27 are in the shape of diamond points or chevrons, optionally rounded, having a cross-section of generally triangular shape in a plane orthogonal to the lower surface 2b. These prominences are adapted to deform plastically the lower surface of the receiving plane under the closing force of the mould and to anchor the plane in its position on closure of the mould. Of course, the profile of these prominences is adapted so as not to affect the planar bearing of the receiving plane 2 on the lower shell 12 once the mould is closed, nor to tear material from the receiving plane 2 during the opening of the mould at the end of the cycle.

In the case where the material of the receiving plane is non-deformable (for example marble or granite), the use of prominences is not desirable. It is then possible to provide an immobilising abutment, for example in the form of a movable wall 28 of a height lower than the thickness of the receiving plane 2, which bears laterally against an outer border of the latter at the points considered to be the most fragile.

Figure 5:
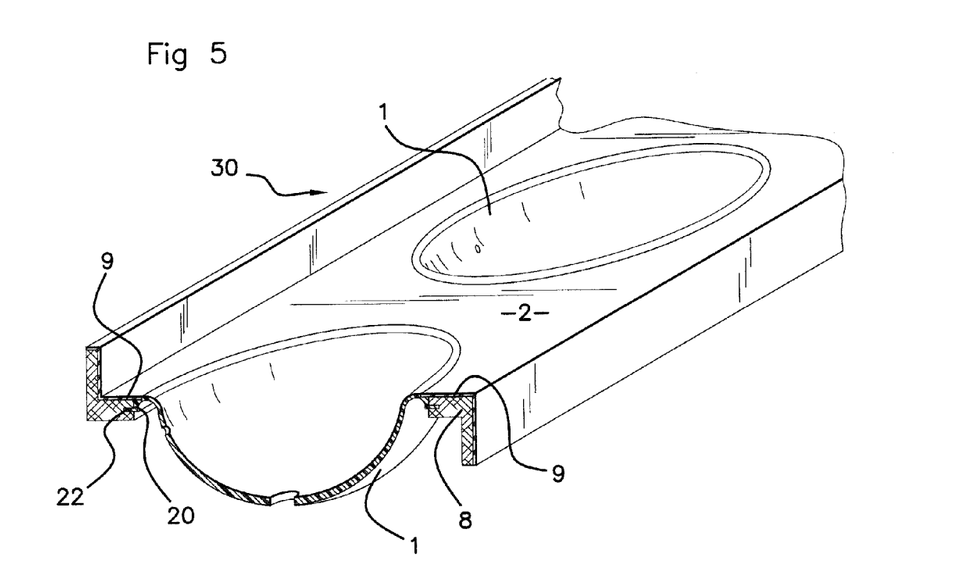
FIG. 5 shows a perspective partially in section of a monobloc plane/basin assembly obtained by the method according to the invention.

The invention also extends to a monobloc assembly 30 as illustrated in FIG. 5, comprising a receiving plane 2, for example formed by a supporting panel 8 covered with a decorative sheet 9 made of laminate. This receiving plane may have forms including a return on the front and a skirting at the back. In this case, the mould 10 is adapted to permit the passage of these projecting parts.

The monobloc assembly 30 comprises at least one basin 1 moulded onto the edge of the opening made in the receiving plane. It may also comprise two or more basins, obtained by successive moulding operations, after a longitudinal displacement of the receiving plane in the mould, provided that the corresponding openings have been prepared.

The invention claimed is:

1. A method for producing a basin integrated in a receiving plane that comprises an upper surface and a lower surface, comprising the steps of:
    forming an opening in the receiving plane, the opening extending through the receiving plane from the lower surface to the upper surface and having an edge that defines a periphery of the opening;
    using an injection mold comprised of a lower shell of generally concave shape and at least one upper shell of generally convex shape, installing the receiving plane on the lower shell with the lower surface of the receiving plane bearing on an upper surface of the lower shell;
    placing the at least one upper shell on the upper surface of the receiving plane such that a lower surface of the at least one upper shell bears on the upper surface of the receiving plane to thereby form, with the lower shell, an impression with a shape of the basin to be obtained, the impression extending to the periphery of the opening;
    clamping the periphery of the opening of the receiving plane between the lower shell and the at least one upper shell such that at least part of the edge of the opening constitutes a continuous peripheral wall connecting the lower shell to the upper shell; and
    injecting a thermoplastic synthetic material into the impression to mold the basin onto the edge of the opening of the receiving plane.

2. A method as claimed in claim 1, wherein each upper shell of the at least one upper shell of the mold bears, in a planar manner, on the receiving plane and forms an upper wall of the impression extending solely at a level of and below the level of the upper surface of the receiving plane, and the injecting step obtains basin molded flush with the upper surface of the receiving plane.

3. A method as claimed in claim 1, wherein the lower shell has a concave zone surrounded by a convex rim extending along the edge of the opening, inside and at a distance from the edge, projecting relative to the level of the lower surface of the receiving plane in a direction of the upper surface (2a), said rim contributing to formation of a peripheral skirt of the basin between the edge of the opening and said rim during the injection step.

4. A method as claimed in claim 3, wherein the lower shell has a shoulder at a base of the rim, facing the edge of the opening, adapted to enable centering of the opening of the receiving plane relative to the injection mold.

5. A method as claimed in claim 4, wherein the shoulder has, at regular intervals, an increased height in a direction of the upper surface of the receiving plane that divides a skirt of the basin into independent sectors.

6. A method as claimed in claim 1, wherein during the injection stage, a single thermoplastic synthetic material is used to form the basin.

7. A method as claimed in claim 6, wherein the thermoplastic synthetic material used is one from the group consisting of polymethylmethacrylate and polycarbonates.

8. A method as claimed in claim 1, wherein the installation of the receiving plane in the mold includes fixing a reinforcing insert to one of the group consisting of the receiving plane and the lower shell.

9. A method as claimed in claim 1, wherein the injection step is divided into two passes comprised of i) a first pass using a first upper shell defining a first impression set back relative to the upper surface of the receiving plane and a first synthetic material chosen to impart a desired mechanical strength to the basin and ii) a second pass using a second upper shell defining a complementary impression above the first impression and a second synthetic material chosen to provide a desired surface finish for the basin.

10. A method as claimed in claim 9, wherein the first synthetic material is chosen from ABS, polycarbonates and polyamides, and the second synthetic material chosen from polymethylmethacrylate and polycarbonates.

11. A method as claimed in claim 1, wherein during the forming step, producing anchors, adapted to enable the anchoring of the basin to the receiving plane, at least on the edge of said opening or in a vicinity of the edge of said opening.

12. A method as claimed in claim 11, wherein said anchors have at least one radial groove formed in the edge of the opening, parallel to the upper and lower surfaces of the receiving plane.

13. A method as claimed in claim 11, wherein the receiving plane comprises a supporting panel covered with a decorative sheet on the upper surface of the receiving plane, and wherein at least one radial groove is formed in the supporting panel, the groove having a width being limited in the direction of the upper surface of the receiving plane by the decorative sheet.

14. A method as claimed in claim 11, wherein said anchors further have an orthogonal groove formed in the lower surface of the receiving plane, substantially parallel to a contour of the opening, and connected to the opening by a radial recess of said lower surface.

15. A method as claimed in claim 12, wherein a series of holes are made in the lower surface of the receiving plane which are orthogonal to the lower surface, regularly spaced on a contour of the opening, at a distance from the edge of the counter, pass through the at lest one radial groove without opening onto the upper surface of the receiving plane, the holes forming a radial anchorage of the basin and a compensating space for the injected synthetic material.

16. A method as claimed in claim 1, wherein during the formation of the opening in the receiving plane, indexing receptacles are made in the lower surface of the receiving plane which are adapted to cooperate with projections formed on the lower shell in order to position and hold the receiving plane in the injection mold.

17. A method as claimed in claim 1, wherein the lower shell has immobilising means for immobilising the receiving plane which are adapted to withstand a radial injection pressure exerted on the edge of the opening.

18. A method as claimed in claim 1, wherein at least one of the upper and lower shells of the mold has bosses interrupting continuity of the impression and adapted to form orifices in the basin during the injecting step.

19. A receiving plane, suitable for carrying out the method as claimed in claim 1, wherein the opening is a closed contour opening passing through said receiving plane from the upper surface to lower surface, wherein said edge has at least one radial groove extending at least partly along a contour of the opening in a plane parallel to the upper and lower surfaces of the receiving plane.

20. A receiving plane as claimed in claim 19, further comprising a supporting panel covered with a decorative sheet on the upper surface of the receiving plane, the radial groove adjoining the decorative sheet which forms an overhang above the groove.

21. A method of forming a monobloc assembly comprising the steps of:
- installing a receiving plane on a lower injection shell with a lower surface of the receiving plane bearing on an upper surface of the lower shell, the receiving plane comprising an opening extending through the receiving plane from the lower surface to an upper surface;
- placing an upper shell on the upper surface of the receiving plane such that a lower surface of the upper shell bears on the upper surface of the receiving plane to thereby form, with the lower shell, an impression with a basin shape, the impression extending to a periphery of the opening of the receiving plane;
- clamping the periphery of the opening of the receiving plane between the lower shell and the upper shell so that the periphery of the opening defines a continuous peripheral wall connecting the lower shell to the upper shell; and
- forming a basin between the upper and lower shells and inside the opening of the receiving plane by injecting a thermoplastic synthetic material into the impression to mold the basin onto the periphery of the opening of the receiving plane, the basin and the receiving plane defining the monobloc assembly.

\* \* \* \* \*